US007715384B2

(12) United States Patent
Kalkunte et al.

(10) Patent No.: US 7,715,384 B2
(45) Date of Patent: May 11, 2010

(54) UNICAST TRUNKING IN A NETWORK DEVICE

(75) Inventors: Mohan Kalkunte, Sunnyvale, CA (US);
John Jeffrey Dull, Sunnyvale, CA (US);
Bruce H. Kwan, Sunnyvale, CA (US);
Venkateshwar Buduma, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 817 days.

(21) Appl. No.: 11/289,497

(22) Filed: Nov. 30, 2005

(65) Prior Publication Data

US 2006/0114901 A1 Jun. 1, 2006

Related U.S. Application Data

(60) Provisional application No. 60/686,456, filed on Jun. 2, 2005, provisional application No. 60/631,548, filed on Nov. 30, 2004.

(51) Int. Cl.
H04L 12/28 (2006.01)
(52) U.S. Cl. .................... 370/389; 370/395.32; 711/216
(58) Field of Classification Search .................. 370/389
See application file for complete search history.

(56) References Cited

U.S. PATENT DOCUMENTS

| 6,041,042 | A | 3/2000 | Bussiere |
| 6,335,932 | B2 * | 1/2002 | Kadambi et al. ............ 370/391 |
| 6,496,502 | B1 | 12/2002 | Fite, Jr. et al. |
| 6,535,510 | B2 | 3/2003 | Kalkunte et al. |
| 6,674,743 | B1 | 1/2004 | Amara et al. |
| 6,792,502 | B1 | 9/2004 | Pandya et al. |
| 6,804,233 | B1 * | 10/2004 | Congdon et al. ............ 370/389 |
| 6,807,179 | B1 * | 10/2004 | Kanuri et al. .......... 370/395.31 |
| 6,963,921 | B1 | 11/2005 | Yang et al. |
| 6,993,026 | B1 | 1/2006 | Baum et al. |
| 7,020,139 | B2 | 3/2006 | Kalkunte et al. |
| 7,031,304 | B1 | 4/2006 | Arberg et al. |
| 7,054,315 | B2 | 5/2006 | Liao |
| 7,089,240 | B2 | 8/2006 | Basso et al. |
| 7,127,566 | B2 | 10/2006 | Ramakrishnan et al. |
| 7,139,753 | B2 | 11/2006 | Bass et al. |
| 7,292,567 | B2 | 11/2007 | Terrell et al. |
| 7,292,573 | B2 | 11/2007 | LaVigne et al. |
| 7,313,135 | B2 | 12/2007 | Wyatt |

(Continued)

OTHER PUBLICATIONS

Non-Final Office Action received for U.S. Appl. No. 12/135,720 mailed on Mar. 19, 2009, 8 pages.

(Continued)

Primary Examiner—Gregory B Sefcheck
Assistant Examiner—Otis L Thompson, Jr.

(57) ABSTRACT

A network device for selecting a port from a trunk group to transmit a unicast packet on the selected port. The network device includes at least one trunk group including a plurality of physical ports. The network device also includes a table with a plurality of entries. Each entry is associated with one trunk group and includes a plurality of fields that are associated with ports in the trunk group. Each entry also includes a hash field that is used to select bits from predefined fields of an incoming unicast packet to obtain an index bit for accessing one of the plurality of fields. The network device transmits the unicast packet to a port associated with an accessed one of the plurality of fields.

8 Claims, 4 Drawing Sheets

U.S. PATENT DOCUMENTS

| | | | |
|---|---|---|---|
| 7,327,748 B2 | 2/2008 | Montalvo et al. | |
| 7,359,383 B2 * | 4/2008 | Wakumoto et al. | 370/395.3 |
| 7,382,787 B1 | 6/2008 | Barnes et al. | |
| 7,408,932 B2 | 8/2008 | Kounavis et al. | |
| 7,408,936 B2 | 8/2008 | Ge et al. | |
| 7,417,990 B2 | 8/2008 | Ikeda et al. | |
| 7,499,456 B2 | 3/2009 | De Silva et al. | |
| 7,515,610 B2 | 4/2009 | Amagai et al. | |
| 7,525,919 B2 | 4/2009 | Matsui et al. | |
| 7,570,639 B2 | 8/2009 | Kalkunte et al. | |
| 7,680,107 B2 | 3/2010 | Kalkunte | |
| 2002/0010791 A1 | 1/2002 | Kalkunte et al. | |
| 2002/0027908 A1 * | 3/2002 | Kalkunte et al. | 370/389 |
| 2002/0126672 A1 | 9/2002 | Chow et al. | |
| 2003/0123459 A1 | 7/2003 | Liao | |
| 2003/0142668 A1 * | 7/2003 | Wyatt | 370/389 |
| 2003/0147385 A1 * | 8/2003 | Montalvo et al. | 370/389 |
| 2004/0236720 A1 | 11/2004 | Basso et al. | |
| 2005/0008009 A1 | 1/2005 | Chen et al. | |
| 2005/0013306 A1 | 1/2005 | Albrecht | |
| 2005/0018693 A1 | 1/2005 | Dull | |
| 2005/0076010 A1 | 4/2005 | Bass et al. | |
| 2005/0083885 A1 | 4/2005 | Ikeda et al. | |
| 2005/0083935 A1 | 4/2005 | Kounavis et al. | |
| 2005/0129019 A1 | 6/2005 | Cheriton | |
| 2005/0138149 A1 | 6/2005 | Bhatia | |
| 2005/0163102 A1 | 7/2005 | Higashitaniguchi et al. | |
| 2005/0180391 A1 | 8/2005 | Shimada | |
| 2005/0190773 A1 | 9/2005 | Yang et al. | |
| 2006/0002393 A1 | 1/2006 | Lappin Jr. et al. | |
| 2006/0039383 A1 | 2/2006 | Ge et al. | |
| 2006/0050702 A1 | 3/2006 | Matsui et al. | |
| 2006/0072572 A1 | 4/2006 | Ikeda et al. | |
| 2006/0114876 A1 | 6/2006 | Kalkunte | |
| 2006/0114908 A1 | 6/2006 | Kalkunte et al. | |
| 2006/0114915 A1 | 6/2006 | Kalkunte et al. | |
| 2006/0114938 A1 | 6/2006 | Kalkunte et al. | |
| 2006/0140130 A1 | 6/2006 | Kalkunte et al. | |
| 2006/0182034 A1 | 8/2006 | Klinker et al. | |
| 2007/0025380 A1 | 2/2007 | Amagai et al. | |
| 2007/0110078 A1 | 5/2007 | De Silva et al. | |
| 2008/0095062 A1 | 4/2008 | Shankar et al. | |
| 2008/0117913 A1 | 5/2008 | Tatar et al. | |

OTHER PUBLICATIONS

Notice of Allowance Received for U.S. Appl. No. 11/289,499, mailed on Apr. 3, 2009, 16 pages.
Non-Final Office Action Received for U.S. Appl. No. 11/289,499, mailed on Oct. 15, 2008, 12 pages.
Non-Final Office Action Received for U.S. Appl. No. 11/289,368, mailed on Mar. 19, 2009, 9 pages.
Non-Final Office Action Received for U.S. Appl. No. 11/289,369, mailed on Mar. 18, 2009, 19 pages.
Non-Final Office Action Received for U.S. Appl. No. 11/289,366, mailed on May 11, 2009, 9 pages.
Non-Final Office Action Received for U.S. Appl. No. 11/289,366, mailed on Oct. 27, 2008, 11 pages.
Non-Final Office Action Received for U.S. Appl. No. 11/289,370, mailed on Oct. 29, 2008, 7 pages.
Non-Final Office Action Received for U.S. Appl. No. 11/289,370, mailed on May 1, 2009, 7 pages.
Non-Final Office Action Received for U.S. Appl. No. 11/289,687, mailed on Aug. 5, 2008, 10 pages.
Final Office Action Received for U.S. Appl. No. 11/289,687, mailed on Jun. 30, 2009, 11 pages.
Non-Final Office Action Received for U.S. Appl. No. 11/289,687, mailed on Dec. 24, 2009, 9 pages.
Notice of Allowance received for U.S. Appl. No. 11/289,368, mailed on Sep. 15, 2009, 17 pages.
Office Action received for U.S. Appl .No. 11/289,369, mailed on Oct. 13, 2009, 33 pages.
Notice of Allowance received for U.S. Appl. No. 11/289,370, mailed on Oct. 6, 2009, 12 pages.
Office Action received for U.S. Appl. No. 11/289,366, mailed on Jan. 25, 2010, 17 pages.
Notice of Allowance received for U.S. Appl. No. 111289,368, mailed on Jan. 14, 2010, 18 pages.
Office Action received for U.S. Appl .No. 11/289,687, mailed on Feb. 3, 2010, 17 pages.

* cited by examiner

| 0 | Mod-ID 302 Port 1 402 | Mod-ID 302 Port 2 404 | Mod-ID 304 Port 4 406 | Mod-ID 304 Port 6 408 | Mod-ID 306 Port 10 410 | Mod-ID 306 Port 11 412 | Mod-ID 302 Port 1 414 | Mod-ID 302 Port 2 416 | RTAG = 1 418 |
|---|---|---|---|---|---|---|---|---|---|
| ⋮ | | | | | | | | | |
| 127 | | | | Trunk Group Table 400 | | | | | |

Figure 4

UNICAST TRUNKING IN A NETWORK DEVICE

CROSS-REFERENCE TO RELATED APPLICATIONS

This application claims priority of U.S. Provisional Patent Application Ser. No. 60/631,548, filed on Nov. 30, 2004 and U.S. Provisional Patent Application Ser. No. 60/686,456, filed on Jun. 2, 2005. The subject matter of these earlier filed applications is hereby incorporated by reference.

BACKGROUND OF THE INVENTION

1. Field of the Invention

The present invention relates to a network device in a data network and more particularly to a system and method of creating a logical port by logically linking multiple ports and for transmitting unicast packets through the logical port.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

A current network device may support physical ports and logical/trunk ports, wherein each trunk port includes a set of physical external ports and the trunk port acts as a single link layer port. Ingress and destination ports on the device may be physical external ports or trunk ports. By logically combining multiple physical ports into a trunk port, the network may provide greater bandwidth for connecting multiple devices. If one port in the trunk fails, information may still be sent between connected devices through other active ports of the trunk. Therefore, trunk ports enable the network to provide greater redundancy between connected network devices.

In order to transmit information from one network device to another, the sending device has to determine if the packet is being transmitted to a trunk destination port. If a destination port is a trunk port, the sending network device must dynamically select a physical external port in the trunk on which to transmit the packet. The dynamic selection must account for load sharing between ports in a trunk so that outgoing packets are adequately distributed across the trunk.

Typically, each packet entering a network device may be one of a unicast packet, a broadcast packet, a muliticast packet, or an unknown unicast packet. The unicast packet is transmitted to a specific destination address that can be determined by the receiving network device. However, the sending network device must select one port from the trunk group and adequately distribute packets across ports of the trunk group.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 4 illustrates a trunk group table that is used in an embodiment of the present invention.

DETAILED DESCRIPTION OF PREFERRED EMBODIMENTS

Reference will now be made to the preferred embodiments of the present invention, examples of which are illustrated in the accompanying drawings.

Figure 1:
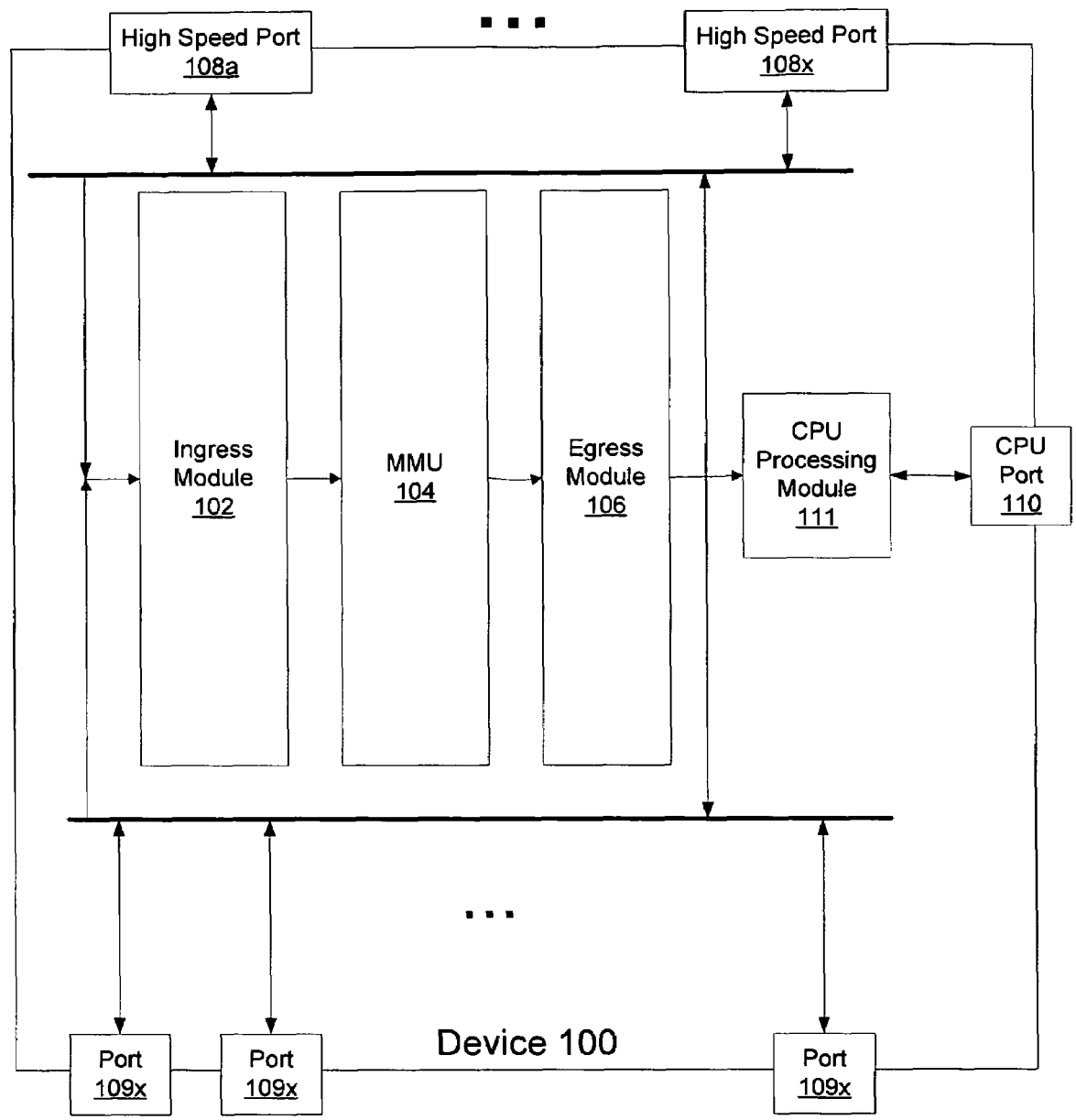
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33 M packets/sec.

Device 100 may also include one or more internal fabric high speed ports, for example a HiGig™, high speed port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. As explained in more detail below, the dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. The XBOD is a block that has one 10GE/12G MAC and supports packets from high speed ports 108a-108x. The GBOD is a block that has 12 10/100/1G MAC and supports packets from ports 109a-109x.

Figure 2:
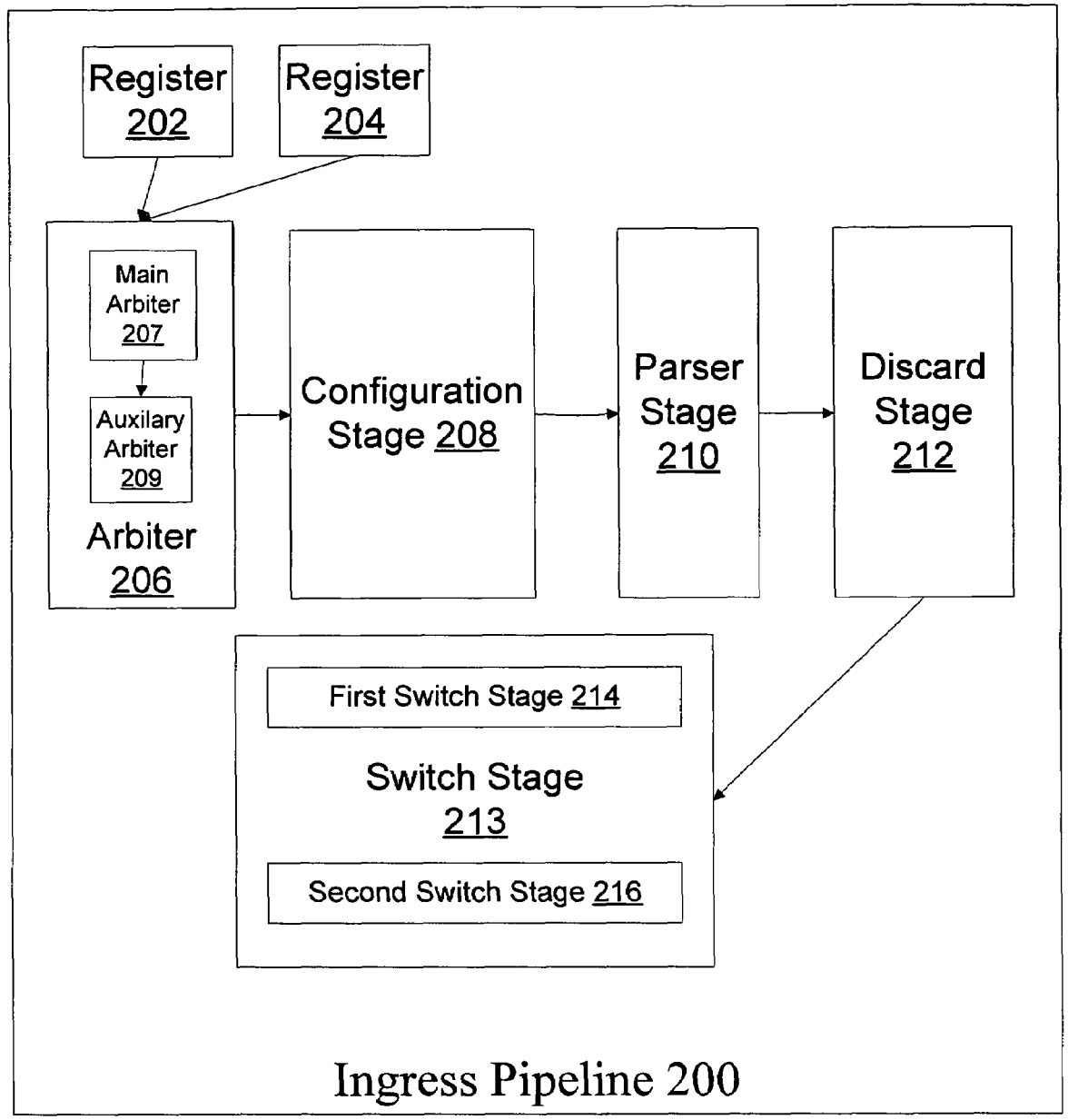
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to one embodiment, the arbiter 206 includes a main arbiter 207 and auxiliary arbiter 209. The main arbiter 207 is a time-division multiplex (TDM) based arbiter that is responsible for scheduling requests from the GBOD and the XBOD, wherein requests from main arbiter 207 are given the highest priority. The auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request. Auxiliary arbiter's 209 requests are scheduled based on available slots from main arbiter 207.

When the main arbiter 207 grants an XBOD or GBOD a slot, the cell data is pulled out of register 202 and sent, along with other information from register 202, down ingress pipeline 200. After scheduling the XBOD/GBOD cell, main arbiter 207 forwards certain status bits to auxiliary arbiter 209.

The auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to one embodiment, auxiliary arbiter 209 implements resource check processing and a strict priority arbitration scheme. The resource check processing looks at all possible pending requests to determine which requests can be sent based on the resources that they use. The strict priority arbitration scheme implemented in an embodiment of the invention requires that CPU access request are given the highest priority, CPU packet transfer requests are given the second highest priority, rate refresh request are given the third highest priority, CPU memory reset operations are given the fourth highest priority and Learn and age operations are given the fifth highest priority by auxiliary arbiter 209. Upon processing the cell data, auxiliary arbiter 209 transmits packet signals to configuration stage 208.

Configuration stage 208 includes a port table for holding all major port specific fields that are required for switching, wherein one entry is associated with each port. The configuration stage 208 also includes several registers. When the configuration stage 208 obtains information from arbiter 206, the configuration stage 208 sets up the inputs for the port table during a first cycle and multiplexes outputs for other port specific registers during a second cycle. At the end of the second cycle, configuration stage 208 sends output to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210. After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and, if one or more of these conditions are present, discard stage drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for layer 2 source station movement and resolves most of the destination processing for layer 2 and layer 3 unicast packets, layer 3 multicast packets and IP multicast packets. The first switch stage 214 also performs protocol packet control switching by optionally copying different types of protocol packets to the CPU or dropping them. The first switch stage 214 further performs all source address checks and determines if the layer 2 entry needs to get learned or re-learned for station movement cases. The first switch stage 214 further performs destination calls to determine how to switch packet based on a destination switching information. Specifically, the first switch stage 214 figures out the destination port for unicast packets or port bitmap of multicast packets, calculates a new priority, optionally traps packets to the CPU and drops packets for various error conditions. The first switch stage 214 further handles high speed switch processing separate from switch processing from port 109a-109i and switches the incoming high speed packet based on the stage header operation code.

The second switch stage 216 then performs Field Processor (FP) action resolution, source port removal, trunk resolution, high speed trunking, port blocking, CPU priority processing, end-to-end Head of Line (HOL) resource check, resource check, mirroring and maximum transfer length (MTU) checks for verifying that the size of incoming/outgoing packets is below a maximum transfer length. The second switch stage 216 takes first switch stage 216 switching decision, any layer routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking.

Figure 3:
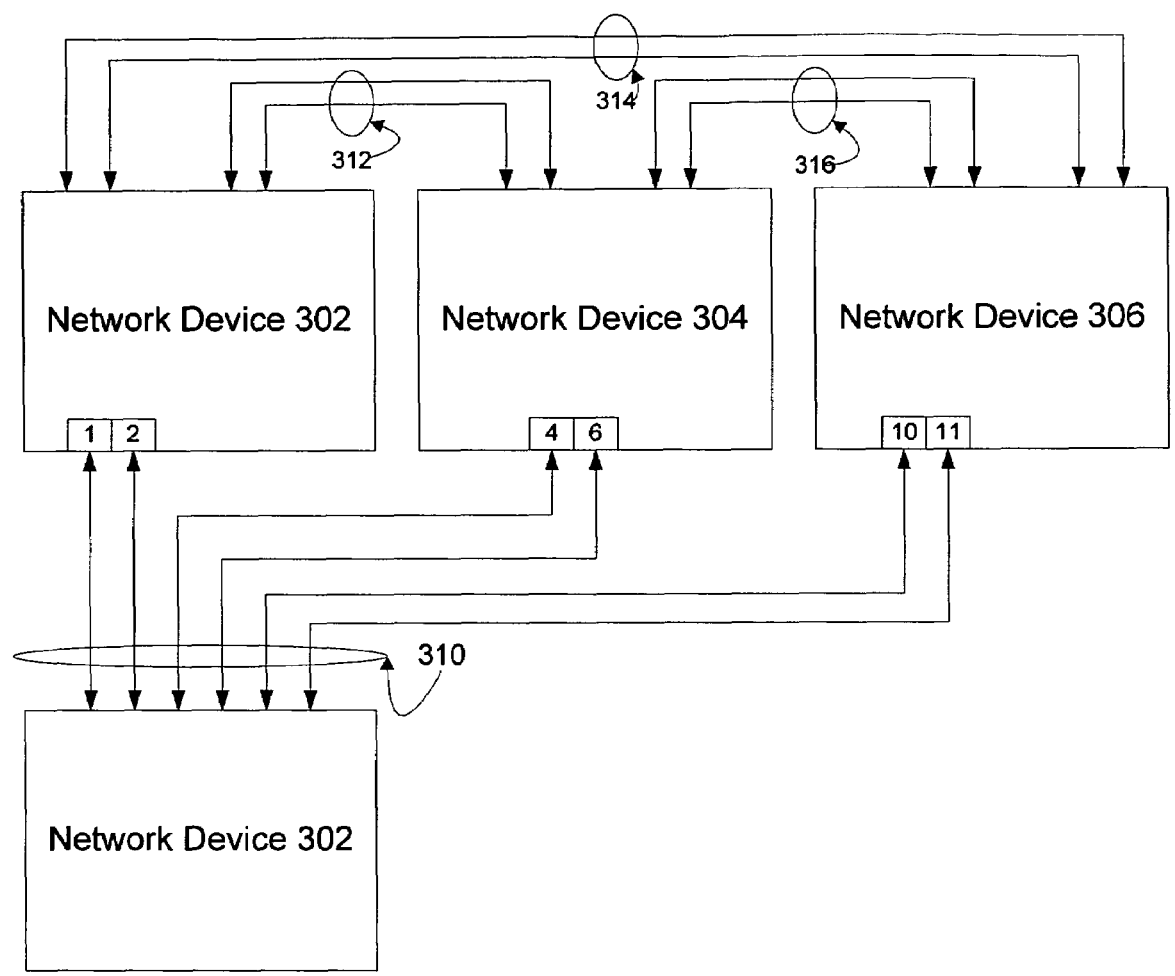
FIG. 3 illustrates an embodiment of the network in which multiple network devices are connected by trunks.

FIG. 3 illustrates an embodiment of a network in which multiple network devices, as described above, are connected by trunks. According to FIG. 3, network 300 includes devices 302-308 which are connected by trunks 310-316. Device 302 includes ports 1 and 2 in trunk group 310, device 304 includes ports 4 and 6 in trunk group 310 and device 306 includes ports 10 and 11 in trunk group 310. Each of network devices 302-308 may receive unicast or multicast packets that must be transmitted to an appropriate destination port. As is known to those skilled in the art, in the case of unicast packets, the destination port is a known port. To send a unicast packet to an appropriate port in a destination trunk, each of network devices 302-308 includes a trunk group table 400, illustrated in FIG. 4.

As noted above, an embodiment of device 100 may support up to 128 trunk ports with up to 8 members per trunk port. As such, table 400 is a 128 entry table, wherein each entry includes fields for eight ports. Therefore, returning to FIG. 3, for trunk group 310, an associated entry in table 400 is entry 0 which includes a field for each module and port in that trunk group. As such, entry 0 of table 400 includes in field 402, module ID 302 and port ID 1, in field 404, module ID 302 and port ID 2, in field 406, module ID 304 and port ID 4, in field 408, module ID 304 and port ID 6, in field 410, module ID 306 and port ID 10 and in field 412, module ID 306 and port ID 11. Since trunk group 310 only has six ports, the last two fields 414 and 416 in entry 0 may include redundant information from any of fields 402-412 of that entry. Table 400 also includes an R-TAG value in each entry. In an embodiment of the invention, the RTAG value may be one of six options, wherein each option is used to identify predefined fields and certain bits are selected from each field. Thereafter, all of the values from each of the predefined fields are XORed to obtain a number between 0 and 7, wherein a port associated with the obtained number is selected from the trunk group to transmit the packet to a destination device. Different RTAGs are used to obtain different types of distribution. Since the distribution is dependent on the packet, the RTAG enables the device to spread packet distribution over all the ports in a given trunk group. In one embodiment of the invention, if the RTAG value is set to 1, the port is selected based on the source address (SA), the VLAN, the EtherType, the source module ID (SRC_MODID) and the source port (SRC_PORT) of the packet. If the RTAG value is set to 2, the port is selected based on the destination address (DA), the VLAN, the EtherType, the source module ID and the source port of the packet. If the RTAG value is set to 3, the port is selected based on the source address, the destination address, the VLAN, the EtherType, the source module ID and the source port of the packet. RTAGs 4, 5 and 6 provide a layer 3 header option. If the RTAG value is set to 4, the port is selected based on the source IP address (SIP) and the TCP source port (TCP_SPORT). If the RTAG value is set to 5, the port is selected based on the destination IP address (DIP) and the TCP destination port (TDP_DPORT). If the RTAG value is set to 6, the port is selected based on a value obtained from XORing an RTAG 4 hash and an RTAG 5 hash.

Specifically, in one embodiment of the invention, since each entry of trunk group table includes eight fields that are associated with trunk group ports, three bits are selected from each byte of the fields in the RTAG hash to represent 8 bits. So if the RTAG value is 1, SA[0:2], SA[8:10], SA[16:18], SA[32:34] and SA[40:42], VLAN[0:2], VLAN [8:10], EtherType[0:2], EtherType[8:10], SRC_MODID[0:2] and SRC_PORT[0:2] are XORed to obtain a three bit value that is used to index trunk group table 400. If the RTAG value is 2, DA[0:2], DA[8:10], DA[16:18], DA[32:34], SA[40:42], VLAN[0:2], VLAN [8:10], EtherType[0:2], EtherType[8:10], SRC_MODID[0:2] and SRC_PORT[0:2] are XORed to obtain a three bit value that is used to index trunk group table 400. If the RTAG value is 3, SA[0:2], SA[8:10], SA[16:18], SA[32:34], SA[40:42], DA[0:2], DA[8:10], DA[16:18], DA[32:34], DA[40:42], VLAN[0:2], VLAN [8:10], EtherType[0:2], EtherType[8:10], SRC_MODID[0:2] and SRC_PORT[0:2] are XORed to obtain a three bit value that is used to index trunk group table 400.

If the RTAG value is 4, SIP[0:2], SIP[8:10], SIP[16:18], SIP[32:34], SIP[40:42], SIP[48:50], SIP[56:58], SIP[66:64], SIP[72:74], SIP[80:82], SIP[88:90], SIP[96:98], SIP[104:106], SIP[112:114], SIP[120:122], TCP_SPORT[0:2] and TCP_SPORT[8:10] are XORed to obtain a three bit value that is used to index trunk group table 400. If the RTAG value is 5, DIP[0:2], DIP[8:10], DIP[16:18], DIP[32:34], DIP[40:42], DIP[48:50], DIP[56:58], DIP[66:64], DIP[72:74], DIP[80:82], DIP[88:90], DIP[96:98], DIP[104:106], DIP[112:114], DIP[120:122], TCP_DPORT[0:2] and TCP_SPORT[8:10] are XORed to obtain a three bit value that is used to index trunk group table 400.

For example, in FIG. 3, upon receiving a unicast packet by network device 308 for further transmission on trunk group 310, ingress module 102 in device 308 performs a destination lookup which points to trunk group 310. Network device then indexes an appropriate entry, i.e. entry 0, in trunk group table 400. To determine which port to select from trunk group 310, device 308 implements a trunk hashing algorithm based on the RTAG value in entry 0. Since the RTAG value in entry 0 is 1, device 308 obtains a three bit index that is used to access one field of entry 0 by XORing SA[0:2], SA[8:10], SA[16:18], SA[32:34] and SA[40:42], VLAN[0:2], VLAN [8:10], EtherType[0:2], EtherType[8:10], SRC_MODID[0:2] and SRC_PORT[0:2]. Upon accessing, for example, the third field, the packet is sent to port 4 of device 304.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for selecting a port from a trunk group to transmit a unicast packet on the selected port the network device comprising:
    at least one trunk group comprising a plurality of physical ports;
    a table comprising a plurality of entries, wherein each entry is associated with one trunk group and comprises a plurality of fields that are associated with ports in the trunk group and wherein each entry comprises a hash field that is used to select bits from predefined fields of an incoming unicast packet to obtain an index bit for accessing one of the plurality of fields, the predefined fields being based on a value stored in the hash field, and including:
        a source address, a VLAN, an Ethertype, a source module identifier and a source port associated with the unicast packet to obtain the index bit for accessing one of the plurality of fields; or
        a destination address, a VLAN, an Ethertype, a source module identifier and a source port associated with the unicast packet to obtain the index bit for accessing one of the plurality of fields; or
        a source address, a destination address, a VLAN, an Ethertype, a source module identifier and a source port associated with the unicast packet to obtain the index bit for accessing one of the plurality of fields; or
        a source IP address, and a TCP source port associated with the unicast packet to obtain the index bit for accessing one of the plurality of fields; or
        a destination IP address, and a TCP destination port associated with the unicast packet to obtain the index bit for accessing one of the plurality of fields; or
        a source IP address, a TCP source port, a destination IP address and a TCP destination port associated with the unicast packet to obtain the index bit for accessing one of the plurality of fields; and
    a transmitter configured to transmit the unicast packet to a port associated with an accessed field of the plurality of fields,
    wherein the network device is configured to hash the selected bits from the predefined fields to obtain the index bit for accessing one of the plurality of fields.

2. The network device according to claim 1, wherein the table is configured as a 128 entry table, wherein each entry comprises fields for eight ports.

3. The network device according to claim 1, wherein each of the plurality of fields are configured to include an identifier for the network device and an identifier for one of the plurality of physical ports in the trunk group.

4. The network device according to claim 1, wherein if the trunk group comprises less than eight ports, the table is configured store redundant information from at least one of the plurality of fields in at least another one of the plurality of fields.

5. The network device according to claim 1, wherein the network device is configured to obtain different distribution types, according to the plurality of values, for distributing incoming packets to ports of the trunk group.

6. The network device according to claim 1, wherein the network device is configured to hash three bits from each byte of the predefined fields to obtain the index bit for accessing one of the plurality of fields.

7. A method for selecting a port from a trunk group to transmit a unicast packet on the selected port, the method comprising:
    associating each entry of a table with a trunk group comprising a plurality of physical ports;
    storing in each of a plurality of fields of each entry, information associated with one of the plurality of ports in the trunk group;
    storing, in each entry of the table, a hash field that is used to select bits from predefined fields of an incoming unicast packet, the predefined fields being based on a value stored in the hash field and including:
        a source address, a VLAN, an Ethertype, a source module identifier and a source port associated with the unicast packet to obtain the index bit for accessing one of the plurality of fields; or
        a destination address, a VLAN, an Ethertype, a source module identifier and a source port associated with the unicast packet to obtain the index bit for accessing one of the plurality of fields; or
        a source address, a destination address, a VLAN, an Ethertype, a source module identifier and a source port associated with the unicast packet to obtain the index bit for accessing one of the plurality of fields; or
        a source IP address, and a TCP source port associated with the unicast packet to obtain the index bit for accessing one of the plurality of fields; or
        a destination IP address, and a TCP destination port associated with the unicast packet to obtain the index bit for accessing one of the plurality of fields; or
        a source IP address, a TCP source port, a destination IP address and a TCP destination port associated with the unicast packet to obtain the index bit for accessing one of the plurality of fields;
    thereafter, receiving the incoming unicast packet for further transmission on one of the plurality of port of the trunk;
    hashing the selected bits from the predefined fields to obtain an index bit for accessing one of the plurality of fields in the entry; and
    transmitting the unicast packet to a port associated with an accessed one of the plurality of fields.

8. The method according to claim 7, further comprising storing, if the trunk group comprises less than eight ports, redundant information from at least one of the plurality of fields in at least another one of the plurality of fields.

* * * * *

UNITED STATES PATENT AND TRADEMARK OFFICE
CERTIFICATE OF CORRECTION

| | |
|---|---|
| PATENT NO. | : 7,715,384 B2 |
| APPLICATION NO. | : 11/289497 |
| DATED | : May 11, 2010 |
| INVENTOR(S) | : Mohan Kalkunte |

Page 1 of 1

It is certified that error appears in the above-identified patent and that said Letters Patent is hereby corrected as shown below:

Column 7, line 27, replace, "selected port" with --selected port,--
Column 8, line 10, insert, --to-- before "store"
Column 8, line 53, replace, "port" with --ports--

Signed and Sealed this

Twenty-third Day of November, 2010

David J. Kappos
*Director of the United States Patent and Trademark Office*